United States Patent
Chen et al.

(10) Patent No.: US 10,292,128 B2
(45) Date of Patent: May 14, 2019

(54) METHOD AND SYSTEM FOR REALIZING WIRELESS POSITIONING, AND DEVICE FOR CALCULATING POSITIONING LOCATION

(71) Applicant: ZTE CORPORATION, Shenzhen, Guangdong Province (CN)

(72) Inventors: Shijun Chen, Shenzhen (CN); Liujun Hu, Shenzhen (CN); Guanghui Yu, Shenzhen (CN); Bo Dai, Shenzhen (CN); Zhaohua Lu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 15/535,714

(22) PCT Filed: Jan. 20, 2015

(86) PCT No.: PCT/CN2015/071151
§ 371 (c)(1),
(2) Date: Jun. 14, 2017

(87) PCT Pub. No.: WO2015/184817
PCT Pub. Date: Dec. 10, 2015

(65) Prior Publication Data
US 2017/0359795 A1  Dec. 14, 2017

(30) Foreign Application Priority Data
Dec. 15, 2014 (CN) .......................... 2014 1 0776357

(51) Int. Cl.
*H04W 24/00* (2009.01)
*H04W 64/00* (2009.01)
(Continued)

(52) U.S. Cl.
CPC ......... *H04W 64/006* (2013.01); *G01S 5/0205* (2013.01); *G01S 5/0236* (2013.01);
(Continued)

(58) Field of Classification Search
CPC ............................. H04W 64/00; H04W 4/02
(Continued)

(56) References Cited

U.S. PATENT DOCUMENTS

2007/0049267 A1* 3/2007 Kota ...................... G01S 5/0036
455/423
2010/0273504 A1* 10/2010 Bull .......................... G01S 5/02
455/456.1
(Continued)

FOREIGN PATENT DOCUMENTS

CN          1864430 A     11/2006
CN        101873690 A     10/2010
(Continued)

*Primary Examiner* — Temica M Beamer
(74) *Attorney, Agent, or Firm* — Ling Wu; Stephen Yang; Ling and Yang Intellectual Property

(57) ABSTRACT

Provided are a method, a system and a positioning location calculation device for realizing wireless positioning. The method includes: a positioning measurement device updating locally and statically stored PSS information according to movement information of the positioning measurement device when network connection is performed (200); receiving a positioning signal transmitted by each PSS in a band of a communication network on a determined wireless resource to obtain time information of the positioning signals transmitted by one or more PSSs (201); and calculating location information based on the time information about the positioning signals transmitted by the one or more PSSs and the PSS information according to a preset positioning mode (202).

20 Claims, 6 Drawing Sheets

(51) Int. Cl.
*G01S 5/14* (2006.01)
*H04W 4/02* (2018.01)
*H04W 56/00* (2009.01)
*H04W 72/04* (2009.01)
*G01S 5/02* (2010.01)
*H04J 11/00* (2006.01)
*G01S 5/00* (2006.01)

(52) U.S. Cl.
CPC .............. *G01S 5/14* (2013.01); *H04W 4/02* (2013.01); *H04W 56/006* (2013.01); *H04W 64/00* (2013.01); *H04W 72/048* (2013.01); *G01S 5/0036* (2013.01); *H04J 11/0063* (2013.01); *H04J 11/0073* (2013.01)

(58) Field of Classification Search
USPC ............................... 455/456.1, 456.5, 456.6
See application file for complete search history.

(56) References Cited

U.S. PATENT DOCUMENTS

| | | | |
|---|---|---|---|
| 2013/0033999 A1 | 2/2013 | Siomina et al. | |
| 2013/0059602 A1* | 3/2013 | Cho | G01S 5/02 455/456.1 |
| 2014/0038642 A1* | 2/2014 | Edge | H04W 64/003 455/456.2 |
| 2017/0295461 A1* | 10/2017 | Smith | H04W 4/02 |

FOREIGN PATENT DOCUMENTS

| | | |
|---|---|---|
| CN | 101932950 A | 12/2010 |
| CN | 102057294 A | 5/2011 |
| CN | 103597861 A | 2/2014 |
| TW | 201016057 A | 4/2010 |

* cited by examiner

METHOD AND SYSTEM FOR REALIZING WIRELESS POSITIONING, AND DEVICE FOR CALCULATING POSITIONING LOCATION

TECHNICAL FIELD

The present application relates to the field of wireless communication, in particular to a method, a system and a positioning location calculation device for realizing wireless positioning.

BACKGROUND

With the continuous development of times, the positioning technology is increasingly concerned. High-accuracy positioning demands, especially meter-scale positioning accuracy, raise higher technical requirements on wireless positioning.

For the GPS positioning technology, due to causes such as signal loss, under the situation that indoor signals become weak, a positioning terminal cannot find enough satellites; for a cellular network system, due to very great errors, higher accuracy cannot be achieved both outdoors and indoors, and the wireless positioning demands cannot be satisfied.

In order to solve the problem of indoor high-accuracy positioning, a wireless positioning system needs to be established on the ground. Each positioning signal station of the ground wireless positioning system is arranged near the ground. There are various ways for establishing a wireless positioning network, including adopting a satellite-system ground pseudo satellite system, a wireless local area network system, etc., herein the ground pseudo satellite system requires mobile phones to be capable of processing coexistence of signals from ground satellites and space satellite and raises a very great requirement on a dynamic range thereof. And the wireless local area network system mainly adopts a ranging method based on signal intensity, the positioning accuracy greatly depends on the density of arranged networks, and which has a very great requirement for the costs of positioning networks.

Communication networks have good coverage. However, the existing communication networks mainly are orientated to communication demands, there are few studies on positioning demands. Positioning errors of communication networks are within a range of a hundred of meters to thousands of meters, and indoor and outdoor positioning demands cannot be satisfied. As a result, communication networks are located at marginal positions in the field of positioning. If the positioning accuracy is improved by increasing the density of communication networks, the great network construction costs will be required and simultaneously the interference between networks will be increased.

Table 1 shows a positioning mode supported in the current LTE standard (source: 3GPP TS 36.305 V12.0.0 (2013-12).

In Table 1, A-GNSS: based on a navigation satellite positioning mode, a satellite signal receiving positioning terminal measures arrival time of a satellite signal, then calculates a location of the positioning terminal according to navigation teletext information and then transmits a result to a positioning center through radio communication. A downlink positioning mode (Downlink): a positioning terminal measures a downlink signal of an LTE base station and sends a measurement result to a positioning center, and in current standards, a UE-assisted mode, i.e., a mode of performing positioning through a positioning center (E-SMLC) assisted by UE, is only supported for the Downlink positioning mode. An enhanced cell ID positioning mode (ECID): positioning is performed according to cell ID and the positioning accuracy is lower. An uplink positioning mode (Uplink): a base station measures signals of a positioning terminal and then sends the signals to a positioning center.

TABLE 1

| Realization mode | Realization feature | | | | |
|---|---|---|---|---|---|
| | UE-based | UE-assisted, E-SMLC-based | eNB-assisted | LMU-assisted/E-SMLC-based | SUPL |
| A-GNSS | Yes | Yes | No | No | Yes[Note 1] (UE-based and UE-assisted) |
| Downlink | No | Yes | No | No | Yes (UE-assisted) |
| E-CID | No | Yes | Yes | No | Yes (UE-assisted) |
| Uplink | No | No | No | Yes | No |

From Table 1, it can be seen that, except A-GNSS, LTE does not support the UE-based positioning mode, i.e., in a Downlink or Uplink mode, positioning must be realized in the positioning center (E-SMLC), through networks. Under scenarios of poor communication conditions, such as great fading and interference, the above-mentioned positioning mode cannot realize positioning of a positioning terminal. As a result, the positioning mode of LTE restricts the realization of positioning by using an LTE system.

SUMMARY

Embodiments of the present disclosure provide a method and a system for realizing wireless positioning, which can add a wireless network positioning mode and improve positioning of positioning terminals under a scenario of poor communication conditions through the added positioning mode.

In order to solve the above-mentioned technical problem, an embodiment of the present disclosure provides a method for realizing wireless positioning, including:

a positioning measurement device updating locally and statically stored positioning network element, PSS, information according to movement information of the positioning measurement device when network connection is performed;

the positioning measurement device receiving a positioning signal transmitted by each PSS in a band of a communication network on a determined wireless resource, obtaining time information of the positioning signal transmitted by each PSS; and calculating location information of the positioning measurement device based on the time information of the positioning signal transmitted by each PSS and the PSS information according to a preset positioning mode.

In an exemplary embodiment, the method previously further includes: locally and statically storing the positioning network element, PSS, information and the positioning mode in the positioning measurement device.

In an exemplary embodiment, the positioning mode includes: a mode with a realization mode which is Downlink and a realization feature which is UE-based=yes;

when the positioning measurement device performs network connection, the positioning measurement device determines together with a positioning center the positioning mode according to a protocol and locally and statically stores the positioning mode; and herein said calculating location information of the positioning measurement device specifically includes:

the positioning measurement device calculating the location information of the positioning measurement device based on the obtained time information of the positioning signal transmitted by each PSS and the locally and statically stored PSS information which is updated by the positioning measurement device; or when the positioning measurement device is unable to perform network connection, the positioning measurement device obtaining the positioning mode from the locally and statically stored positioning mode; and herein said calculating location information of the positioning measurement device specifically includes:

the positioning measurement device calculating the location information of the positioning measurement device based on the obtained time information of the positioning signal transmitted by each PSS and the locally and statically stored PSS information in the positioning measurement device.

In an exemplary embodiment, the movement information of the positioning measurement device is a cell identification, CELL ID, of a base station to which the positioning measurement device belongs; and herein said updating the locally and statically stored PSS information includes:

when the positioning measurement device accesses to a network and sends a positioning request, if the cell identification, CELL ID, of the base station to which the positioning measurement device belongs is different from a CELL ID of a base station to which the positioning measurement device belongs when the positioning measurement device sends a positioning request at a previous time, the positioning measurement device sending the CELL ID of the base station to which the positioning measurement device belongs when the positioning request is sent at a current time to a positioning center, E-SMLC to obtain one or more PMS IDs of one or more positioning management network elements, PMSs, from the E-SMLC, and downloading PSS information to perform updating according to the one or more PMS IDs, herein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong; and herein the PSS information is:

IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system, OAM, to the E-SMLC for storage.

In an exemplary embodiment, the positioning mode further includes: a mode with a realization mode which is Downlink and a realization feature which is UE-based=no, UE=assisted and positioning center E-SMLC-based=yes;

when the positioning measurement device performs network connection, the positioning measurement device determines together with a positioning center the positioning mode according to a protocol and locally and statically stores the positioning mode; or when the positioning measurement device is unable to perform network connection, the positioning measurement device obtaining the positioning mode from the locally and statically stored positioning mode; and if the movement information of the positioning measurement device is a CELL ID of a base station to which the positioning measurement device belongs, the method further includes:

when the positioning measurement device accesses to a network and sends a positioning request, if the cell identification, CELL ID, of the base station to which the positioning measurement device belongs is different from a CELL ID of a base station to which the positioning measurement device belongs when the positioning measurement device sends a positioning request at a previous time, the positioning measurement device sending the CELL ID of the base station to which the positioning measurement device belongs when the positioning request is sent at a current time to the positioning center, E-SMLC, to obtain one or more PMS IDs of one or more positioning management network element, PMSs, from the E-SMLC, and downloading PSS information to perform updating according to the one or more PMS IDs, herein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong;

herein, the PSS information is: IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system, OAM, to the E-SMLC for storage; and the positioning measurement device sending the obtained corresponding time information of the positioning signals transmitted by each PSS to the E-SMLC according to each PSS ID determined by the E-SMLC, and the E-SMLC querying corresponding location information and/or clock bias information of each PSS from the PSS information stored in the E-SMLC according to each PSS ID; and calculating the location information of the positioning measurement device based on the time information of the positioning signals transmitted by each PSS and the queried corresponding location information and/or clock bias information of each PSS.

In an exemplary embodiment, the method further includes: the positioning measurement device storing the CELL ID of the base station to which the positioning measurement device belongs when the positioning request is sent, and the corresponding PSS ID, obtained according to the CELL ID, of each PSS respectively governed by one or more PMSs;

when the CELL ID of the base station to which the positioning measurement device belongs is same with the stored CELL ID of the base station to which the positioning measurement device belongs when the positioning request is sent, the positioning measurement device sending the obtained corresponding time information of the positioning signal transmitted by each PSS to the E-SMLC according to each PSS ID; and the E-SMLC querying the corresponding location information and/or clock bias information of each PSS from the PSS information stored in the E-SMLC according to each PSS ID; and calculating the location information of the positioning measurement device based on the time information of the positioning signals transmitted by each PSS and the queried corresponding location information of and/or clock bias information each PSS.

In an exemplary embodiment, the method further includes:

when the preset positioning mode is a mode with a realization mode which is Downlink and a realization feature which is UE-based=yes, if a positioning request is not a positioning request initiated by the positioning measurement device aiming at the positioning measurement device, the positioning measurement device sending the location information to the E-SMLC; and if a positioning request is a positioning request initiated by the positioning measurement device aiming at the positioning measurement device, the positioning measurement device not sending the location information to the E-SMLC.

In an exemplary embodiment, the method further includes:

when the preset positioning mode is a mode with a realization mode which is Downlink and a realization feature which is UE-based=no, UE=assisted and positioning center E-SMLC-based=yes, the E-SMLC sending the calculated location information of the positioning measurement device to the positioning measurement device which initiates the positioning request or other terminals.

In an exemplary embodiment, when a PMS is arranged at a base station, an ID of the PMS is a CELL ID of the base station;

when a PMS and a base station are separately arranged, an ID of the PMS is a preset ID associated with a CELL ID of a base station adjacent to the PMS.

In an exemplary embodiment, the time information of the positioning signal transmitted by the PSS specifically includes:

corresponding arrival time, received by the positioning measurement device on the determined wireless resource according to an ID of each PSS, of the positioning signal transmitted by each PSS.

In an exemplary embodiment, the determined wireless resource is: a wireless resource used by each PSS for transmitting the positioning signal.

In an exemplary embodiment, the clock bias information includes: clock bias information of each PSS relative to a reference clock, and/or clock bias information between each PMS;

if the positioning signal transmitted by each PSS has already been corrected according to the reference clock, the clock bias information does not include the clock bias information of each PSS relative to the reference clock; and if clocks between each PMS has already been corrected, the clock bias information does not include the clock bias information between each PMS.

An embodiment of the present disclosure further provides a system for realizing wireless positioning, including a positioning measurement device and a positioning location calculation device, herein, the positioning measurement device includes a positioning information storage unit and a positioning calculation unit;

herein, the positioning information storage unit is configured to update locally and statically stored positioning network element, PSS, information according to movement information of the positioning measurement device when network connection is performed; and the positioning measurement unit is configured to receive a positioning signal transmitted by each PSS in a band of a communication network on a determined wireless resource to obtain time information of the positioning signal transmitted by each PSS; and send the time information of the positioning signal transmitted by each PSS to a location calculation unit according to a preset positioning mode; and the positioning location calculation device includes a positioning mode unit and a location calculation unit, herein, the positioning mode unit is configured to preset a positioning mode; and the location calculation unit is configured to calculate location information of the positioning measurement device based on the received time information of the positioning signal transmitted by each positioning network element, PSS, and the PSS information according to the preset positioning mode.

In an exemplary embodiment, the positioning mode unit is further configured to send the preset positioning mode to the positioning information storage unit for storage; and the positioning information storage unit is further configured to locally and statically store the positioning network element, PSS, information and the preset positioning mode.

In an exemplary embodiment, the positioning mode unit is configured to, when the positioning measurement device is able to connect with a network, determine together with a positioning center the preset positioning mode according to a protocol; or when the positioning measurement device is unable to connect with a network, read the preset positioning mode from the positioning information storage unit;

herein when the preset positioning mode is: a mode with a realization mode which is Downlink and a realization feature which is UE-based=yes; and the location calculation unit is configured to, according to the preset positioning mode, when the positioning measurement device is able to connect with the network, calculate the location information of the positioning measurement device based on the received time information of the positioning signal transmitted by each positioning network element, PSS, and the PSS information which is updated by the positioning information storage unit; and when the positioning measurement device is unable to connect with the network, calculate the location information of the positioning measurement device based on the received time information of the positioning signal transmitted by each positioning network element, PSS, and the PSS information which is stored by the positioning information storage unit.

In an exemplary embodiment, the positioning information storage unit is configured to locally and statically store the positioning network element, PSS information, and the preset positioning mode; when a network is accessed and a positioning request is sent, if a cell identification, CELL ID, of a base station to which the positioning measurement device belongs is different from a CELL ID of a base station to which the positioning measurement device belongs when the positioning measurement device sends a positioning request at a previous time, the positioning measurement device sends the CELL ID of the base station to which the positioning measurement device belongs when the positioning request is sent at a current time to the positioning center, E-SMLC, to obtain one or more PMS IDs of one or more positioning management network elements, PMSs, from the E-SMLC, and downloads PSS information to perform updating according to the one or more PMS IDs, herein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong; and herein the PSS information is:

IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system OAM to the E-SMLC for storage.

In an exemplary embodiment, the system further includes a positioning center, E-SMLC;

the positioning mode unit is further configured to, when the positioning measurement device is connected with a network, determine together with the positioning center the preset positioning mode according to a protocol; or when the positioning measurement device is unable to connect with a network, obtain the preset positioning mode from the locally and statically stored positioning mode, herein the preset positioning mode is: a mode with a realization mode which is Downlink and a realization feature which is UE-based=no, UE=assisted and positioning center E-SMLC-based=yes;

the positioning measurement device further includes a sending and receiving unit configured to, when accessing to a network and sending a positioning request sent, if a cell identification, CELL ID, of a base station to which the positioning measurement device belongs is different from a CELL ID of a base station to which the positioning measurement device belongs when the positioning measurement device sends a positioning request at a previous time, send the CELL ID of the base station to which the positioning measurement device belongs when a positioning request is sent at a current time to the, E-SMLC; and receive ID information, which is obtained by the E-SMLC by querying the PSS information, of each PSS respectively governed by one or more PMSs, and send corresponding time information of the positioning signal transmitted by each PSS to the location calculation unit according to the ID of each PSS;

the E-SMLC is configured to determine a PMS ID of each PMS to which one or more PSSs with a distance that is less than a preset threshold to a geographical location of the base station corresponding to the CELL ID, respectively belong, according to the CELL ID sent by the sending and receiving unit, query PSS information according to each PMS ID to obtain information of a PSS ID of each PSS respectively governed by each PMS, and send the information to the sending and receiving unit; query corresponding location information and/or clock bias information of each PSS from the PSS information stored in the E-SMLC according to the PSS ID of each PSS; and calculate the location information of the positioning measurement device based on the time information of the positioning signal transmitted by each PSS and the queried corresponding location information of and/or clock bias information each PSS; and herein the PSS information is: IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system, OAM, to the E-SMLC for storage.

In an exemplary embodiment, the positioning location calculation device further includes a location sending unit, configured to, if a positioning request is not a positioning request initiated by the positioning measurement device aiming at the positioning measurement device, send the location information to the E-SMLC; and if a positioning request is a positioning request initiated by the positioning measurement device aiming at the positioning measurement device, not send the location information to the E-SMLC.

In an exemplary embodiment, the positioning location calculation device further includes a location sending unit, configured to set the E-SMLC to send the calculated location information of the positioning measurement device to the positioning measurement device which initiates the positioning request or other terminals.

In an exemplary embodiment, the positioning information storage device is a nonvolatile storage device which is still capable of saving PSS information and set positioning mode information during power outage.

An embodiment of the present disclosure further provides a positioning location calculation device for realizing wireless positioning, including: a positioning mode unit and a location calculation unit, herein, the positioning mode unit is configured to preset a positioning mode; and the location calculation unit is configured to calculate location information of a positioning measurement device based on received time information of a positioning signal transmitted by each positioning network element, PSS, and PSS information according to the preset positioning mode.

In an exemplary embodiment, the positioning mode unit is configured to, when the positioning measurement device is able to connect with a network, determine together with a positioning center, E-SMLC, the preset positioning mode according to a protocol; or when the positioning measurement device is unable to connect with a network, read the preset positioning mode from a positioning information storage unit of the positioning measurement device, herein the preset positioning mode is: a mode with a realization mode which is Downlink and a realization feature which is UE-based=yes; and the location calculation unit is configured to, according to the preset positioning mode, when the positioning measurement device is able to connect the network, calculate the location information of the positioning measurement device based on the received time information of the positioning signal transmitted by each positioning network element, PSS, and PSS information which is updated by the positioning information storage unit; and when the positioning measurement device is unable to connect with the network, calculate the location information of the positioning measurement device based on the received time information of the positioning signal transmitted by each positioning network element, PSS, and the PSS information which is stored by the positioning information storage unit.

In an exemplary embodiment, the positioning mode unit is further configured to, when the positioning measurement device is able to connect a network, determine together with an evolved serving mobile location center, E-SMLC, the preset positioning mode according to a protocol; and when the positioning measurement device is unable to connect with a network, read the preset positioning mode from a positioning storage unit, herein the preset positioning mode is: a mode with a realization mode which is Downlink and a realization feature which is UE-based=no, UE=assisted and E-SMLC-based=yes; and the location calculation unit is configured to, when the realization mode is Downlink and the realization feature is UE-based=no, UE=assisted and E-SMLC-based=yes, determine the E-SMLC to calculate the location information of the positioning measurement device based on time information of the positioning signal transmitted by each positioning network element, PSS, and PSS information.

In an exemplary embodiment, the device further includes a location sending unit configured to, if a positioning request is not a positioning request initiated by the positioning measurement device aiming at the positioning measurement device, send the location information to the E-SMLC; and if a positioning request is a positioning request initiated by the positioning measurement device aiming at the positioning measurement device, not send the location information to the E-SMLC.

In an exemplary embodiment, the device further includes a location sending unit configured to set the E-SMLC to send the calculated location information of the positioning measurement device to the positioning measurement device which initiates the positioning request or other terminals.

An embodiment of the present disclosure further provides a computer program and a carrier carrying a computer program, herein the computer program includes program instructions, which, when executed by a positioning measurement device, enable the positioning measurement device to implement the above method for realizing wireless positioning.

As compared with the prior art, the technical solution provided by the embodiments of the present disclosure includes: a positioning measurement device updating locally and statically stored positioning network element, PSS, information according to movement information of the positioning measurement device when network connection is performed; the positioning measurement device receiving positioning signals transmitted by each PSS in a band of a communication network on a determined wireless resource to obtain time information of the positioning signal transmitted by each PSS; and calculating location information of the positioning measurement device based on the time information of the positioning signals transmitted by each PSS and the PSS information according to a preset positioning mode. In the method provided by the present disclosure, by performing the positioning of the positioning measurement device through the added positioning modes by using the newly added positioning network elements, the positioning of the positioning measurement device on a UE side based on the time information about the positioning signals transmitted by each PSS and the PSS information is realized, the positioning accuracy and applicability of communication network-based positioning are improved, and the dependence of positioning on the communication network is reduced.

BRIEF DESCRIPTION OF DRAWINGS

The drawings are used for providing optional understandings about the technical solution of the present application, constitute a part of the description, and are used together with the embodiments of the present application for understanding the technical solution of the present application instead of limiting the technical solution of the present application.

DETAILED DESCRIPTION

Embodiments of the present disclosure will be described below in detail with reference to the drawings. It needs to be stated that the embodiments in the present application and the features in the embodiments may be mutually and freely combined under a situation of no conflict. Besides, although a logic sequence is illustrated in the flowchart, the illustrated or described steps may be executed according to a sequence different from the sequence here under some circumstances.

In order to clearly state the contents of the embodiments of the present disclosure, partial technologies and concepts involved in the embodiments of the present disclosure will be briefly described below.

Figure 1:
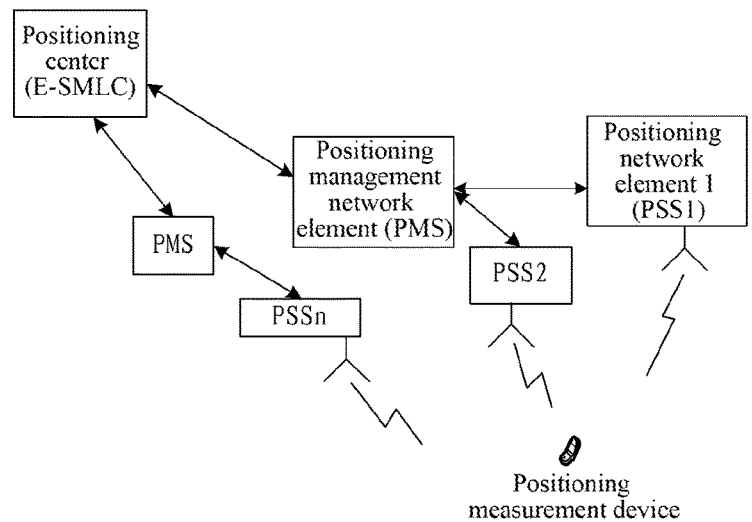
FIG. 1(a) illustrates a structural diagram of a network applied by an embodiment of the present disclosure.
FIG. 1(b) illustrates a schematic diagram of interfaces between network elements in a network structure applied by an embodiment of the present disclosure.
Figure 1:
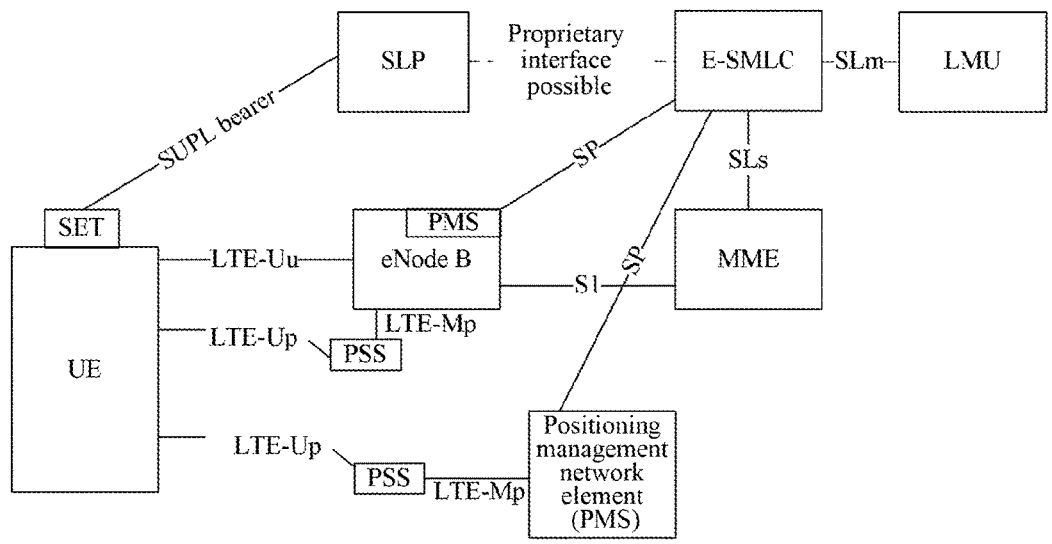

FIG. 1(a) illustrates a structural diagram of a network applied by an embodiment of the present disclosure. As illustrated in FIG. 1(a), the network at least includes a positioning center (E-SMLC), positioning management network elements (PMSs), positioning network elements (PSSs) and a positioning measurement device, herein each PSS transmits a positioning signal to the positioning measurement device; each PMS includes one or more PSSs; and the positioning network elements are positioning devices newly added in a coverage range of a base station in order to realize location positioning of the positioning measurement device. Here, the positioning network elements are a type of devices newly added in a communication network in order to solve the positioning problem of the communication network, may be arranged in the base station to form an integral device with the base station, and may also be independent devices. The positioning network elements may be only configured to transmit positioning signals. Bandwidth used when the positioning network elements transmit signals is located in a bandwidth of the communication network. The positioning management network elements may be independent devices, may also be arranged in the base station and belong to the same device as the base station. One positioning management network element may management one or more positioning network elements.

FIG. 1(b) illustrates a schematic diagram of interfaces between network elements in a network structure applied by an embodiment of the present disclosure. In combination with FIG. 1(b), a communication interface between the base station (eNodeB) and the positioning measurement device is LTE-Uu interface and is used for supporting an LTE communication protocol. The positioning management network elements may be integrated in the base station and may also be independent devices, and an interface between each positioning management network element and each positioning network element is LTE-Mp interface and is mainly used for transmitting positioning information and realizing a synchronizing function. An interface between each positioning network element and the positioning measurement device is LTE-Up interface and mainly has a function of transmitting positioning signals. An interface between each positioning management network element and the positioning center (E-SMLC) is SP and is used for transmitting location information and clock bias information of PSSs; and a positioning user plane protocol and an entity (SUPL and SLP) are used as an interface between the positioning measurement device and the positioning center, for downloading PSS location information and clock bias information, uploading measurement time information of each PSS, etc.

Figure 2:
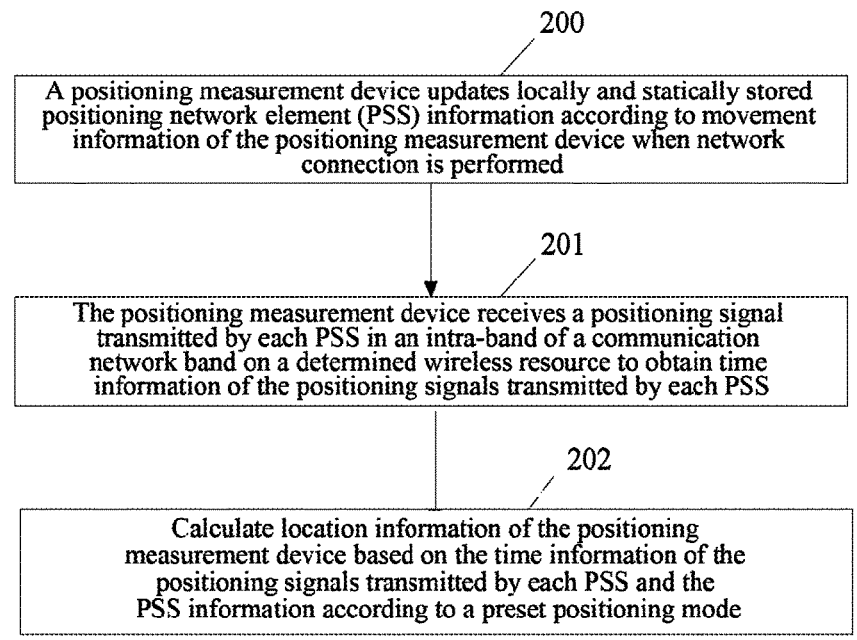
FIG. 2 illustrates a flowchart of a method for realizing wireless positioning according to an embodiment of the present disclosure.

FIG. 2 illustrates a flowchart of a method for realizing wireless positioning according to an embodiment of the present disclosure. As illustrated in FIG. 2, the method includes the following step 200-step 202.

In step 200, a positioning measurement device updates locally and statically stored positioning network element (PSS) information according to movement information of the positioning measurement device when network connection is performed.

Before the step, the method further includes that, the positioning network element (PSS) information and all positioning modes are locally and statically stored in the positioning measurement device.

The movement information of the positioning measurement device is a cell identification (CELL ID) of a base station to which the positioning measurement device belongs.

Herein, the step of updating the locally and statically stored PSS information includes the following operations.

When the positioning measurement device accesses to a network and sends a positioning request, if the cell identification (CELL ID) of the base station to which the positioning measurement device belongs is different from a CELL ID of a base station to which the positioning measurement device belongs when a positioning request is sent at a previous time, the positioning measurement device sends the CELL ID of the base station to which the positioning measurement device belongs when the positioning request is sent at a current time to a positioning center E-SMLC, so as to obtain one or more PMS IDs of one or more positioning management network elements (PMSs) from the E-SMLC, and downloads PSS information to perform updating according to the one or more PMS IDs, herein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong.

It needs to be stated that the setting of the preset threshold is determined according to coverage area of the base station, density of the positioning network elements and the number of positioning network elements needed during location calculation of the positioning measurement device.

Herein, the PSS information is:

IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system (OAM) to the E-SMLC for storage.

It needs to be stated that, when the positioning measurement device locally and statically stores PSS information and performs communication network connection, the PSS information may be updated such that the positioning measurement device can perform location calculation based on the PSS information.

In step 201, the positioning measurement device receives a positioning signal transmitted by each PSS in a band of a communication network on a determined wireless resource to obtain time information of the positioning signals transmitted by each PSS.

Herein, "in a band of a communication network band" refers to "in a band range of the same communication network".

In the step, the determined wireless resource is: a wireless resource used by each PSS for transmitting the positioning signal.

The time information about the positioning signals transmitted by the PSS specifically includes:

arrival time, received by the positioning measurement device on the determined wireless resource according to an ID of each PSS, of the positioning signals transmitted by each PSS.

It needs to be stated that the step of calculating the location information of the positioning measurement device based on the time information of the positioning signal transmitted by each PSS and the PSS information specifically includes that, a distance between the positioning network element and the positioning measurement device is determined based on a time difference that the positioning network element sends the positioning signals to the positioning measurement device. A specific method for obtaining distance through time information is a common technical means adopted by one skilled in the art.

In step 202, location information of the positioning measurement device is calculated based on the time information of the positioning signal transmitted by each PSS and the PSS information according to a preset positioning mode.

The positioning mode includes: a mode with a realization mode which is Downlink and a realization feature which is UE-based=yes.

It needs to be stated that the mode with the realization mode which is Downlink and the realization feature which is UE-based=yes refers to a positioning mode with the realization mode which adopts a downlink and the realization feature that UE performs positioning.

When the positioning measurement device performs network connection, the positioning measurement device determines together with the positioning center the preset positioning mode, which is a mode with a realization mode which is Downlink and a realization feature which is UE-based=yes, according to a protocol, and locally and statically stores the determined positioning mode. Here, determining the preset positioning mode according to the protocol refers to determining the preset positioning mode according to a current standard protocol of Location Services (LTE LCS), which may also be called as location service protocol.

The step of calculating the location information of the positioning measurement device specifically includes that, the positioning measurement device calculates the location information of the positioning measurement device based on the obtained time information of the positioning signal transmitted by each PSS and the locally and statically stored PSS information which is updated by the positioning measurement device. Or, when the positioning measurement device is unable to perform network connection, the positioning measurement device obtains the preset positioning mode, which is a mode with a realization mode which is Downlink and a realization feature which is UE-based=yes, from the locally and statically stored positioning mode.

And the step of calculating the location information of the positioning measurement device specifically includes that, the positioning measurement device calculates the location information of the positioning measurement device based on the time information about the positioning signals transmitted by each PSS and the locally and statically stored PSS information in the positioning measurement device.

The positioning mode further includes: a mode with a realization mode which is Downlink and a realization feature which is UE-based=no, UE=assisted and positioning center E-SMLC-based=yes.

It needs to be stated that the mode with the realization mode which is Downlink and the realization feature which is UE-based=no, UE=assisted and positioning center E-SMLC-based=yes refers to a positioning mode with the realization mode which is a downlink mode and the realization feature that UE does not perform positioning but the positioning center performs positioning under the assistance of UE.

When the positioning measurement device performs network connection, the positioning measurement device determines together with a positioning center the preset positioning mode, which is a mode with a realization mode which is Downlink and a realization feature which is UE-based=no, UE=assisted and positioning center E-SMLC-based=yes, according to a protocol, and locally and statically stores the positioning mode; or when the positioning measurement device is unable to perform network connection, the positioning measurement device obtains the positioning mode, which is a mode with a realization mode which is Downlink and a realization feature which is UE-based=no, UE=assisted and positioning center E-SMLC-based=yes, from the locally and statically stored positioning mode.

If the movement information of the positioning measurement device is a CELL ID of a base station to which the positioning measurement device belongs, the method further includes following operations.

When the positioning measurement device accesses a network and sends a positioning request, if the cell identification (CELL ID) of the base station to which the positioning measurement device belongs is different from a CELL ID of a base station to which the positioning measurement device belongs when a positioning request is sent at a previous time, the positioning measurement device sends the CELL ID of the base station to which the positioning measurement device belongs when the positioning request is sent at a current time to a positioning center E-SMLC, so as to obtain one or more PMS IDs of one or more positioning management network element (PMSs) from the E-SMLC, and queries PSS information according to the one or more PMS IDs to obtain PSS ID information of one or more PSS governed by the one or more PMSs. Herein the one or more PMSs are PMSs which are determined by the E-SMLC according to the received CELL ID and to which one or more PSSs with a distance less than a preset threshold to a geographical location of the base station to which the positioning measurement device belongs when the positioning request is sent, respectively belong.

The positioning measurement device sends the corresponding time information of the positioning signal transmitted by each PSS to the positioning center according to the one or more PSS IDs, and the positioning center queries corresponding location information and/or clock bias information of each PSS from the PSS information stored in the positioning center according to the one or more PSS IDs; and calculates the location information of the positioning measurement device based on the time information of the positioning signal transmitted by each PSS and the queried corresponding location information of each PSS and/or clock bias information.

The PSS information is: IDs of one or more PSSs governed by each PMS, location information of the PSSs and/or clock bias information, which are transmitted by each positioning management network element to the E-SMLC for storage; or IDs of one or more PSSs governed by each PMS, location information of the PSSs and/or clock bias information, which are configured by a management maintenance system (OAM) to the E-SMLC for storage.

For example, the PSS information is location information and clock bias information of PSS1 managed by positioning management network element 1 (PMS1) and location information and clock bias information of PSS2.

The PSS information is location information and clock bias information of PSS3 managed by positioning management network element 2 (PMS2) and location information and clock bias information of PSS4.

The PSS information is location information and clock bias information of PSS5 managed by positioning management network element 3 (PMS3) and location information and clock bias information of PSS6.

The method provided by the embodiment of the present disclosure further includes that, the positioning measurement device stores the CELL ID of the base station to which the positioning measurement device belongs when the positioning request is sent, and the corresponding PSS ID, obtained according to the CELL ID, of each PSS governed by each PMS.

When the CELL ID of the base station to which the positioning measurement device belongs is the same as the stored CELL ID of the base station to which the positioning measurement device belongs when the positioning request is sent, the positioning measurement device sends the obtained corresponding time information about the positioning signals transmitted by each PSS to the positioning center according to each PSS ID.

The positioning center queries the corresponding location information and/or clock bias information of each PSS from the PSS information stored in the positioning center according to each PSS ID, and calculates the location information of the positioning measurement device based on the time information of the positioning signal transmitted by each PSS and the queried corresponding location information and/or clock bias information of each PSS.

In the embodiment of the present disclosure, through the newly added positioning mode with the realization mode which is Downlink and the realization feature which is UE-based, when network connection is performed, the locally and statically stored PSS information and positioning mode are updated. And when network connection is not performed, the locally and statically stored PSS information and positioning mode are directly read. Since the positioning signals are transmitted by adopting a broadcasting mode and network resources of the communication network are not needed, when the communication network is unable to perform network connection, the positioning of the positioning measurement device can still be performed.

In the LTE protocol standard, Table 1 has already defined other positioning modes with allowed realization modes and realization features. The embodiment of the present disclosure newly puts forwards a positioning mode with a realization mode which is Downlink and a realization feature which is UE-based=yes and a positioning mode with a realization mode which is Downlink and a realization feature which is UE-based=no, UE=assisted and position center E-SMLC-based=yes. Table 2 is an information table including the positioning modes in the embodiment of the present disclosure.

As compared with the existing technology, the embodiment of the present disclosure adds the part of calculating the location information of the positioning measurement device through the positioning measurement device. From the method provided by the embodiment of the present disclosure, it can be seen that, since the preset positioning mode is added and the location calculation of the positioning measurement device is performed by using the newly added positioning network elements, the positioning accuracy of the positioning measurement device is improved. And the realization mode of positioning calculation is increased by defining the positioning measurement device to perform location calculation.

In the embodiment of the present disclosure, the clock bias information includes: clock bias information of each PSS relative to a reference clock, and/or clock bias information between each PMS.

If the positioning signal transmitted by each PSS has already been corrected according to the reference clock, the clock bias information does not include the clock bias information of each PSS relative to the reference clock.

If a clock between each PMS has already been corrected, the clock bias information does not include the clock bias information between each PMS.

TABLE 2

| Realization mode | Realization feature | | | | |
| --- | --- | --- | --- | --- | --- |
| | UE-based | UE-assisted, E-SMLC-based | eNB-assisted | LMU-assisted/ E-SMLC-based | SUPL |
| A-GNSS | Yes | Yes | No | No | Yes<sup>Note 1</sup> (UE-based and UE-assisted) |
| Downlink | Yes | Yes | No | No | Yes (UE-assisted And UE-based) |
| E-CID | No | Yes | Yes | No | Yes (UE-assisted) |
| Uplink | No | No | No | Yes | No |

The method provided by the embodiment of the present disclosure further includes the following operations.

When the preset positioning mode is a mode with a realization mode which is Downlink and a realization feature which is UE-based=yes, if a positioning request is initiated by the positioning measurement device aiming at the positioning measurement device, the positioning measurement device does not send the location information to the E-SMLC, otherwise, the positioning measurement device sends the location information to the E-SMLC.

When the preset positioning mode is a mode with a realization mode which is Downlink and a realization feature which is UE-based=no, UE=assisted and positioning center E-SMLC-based=yes, the E-SMLC sends the calculated location information of the positioning measurement device to the positioning measurement device which initiates the positioning request or other terminals.

In the above-mentioned two positioning modes, the PMS ID is involved in both updating the locally and statically stored PSS information in the positioning measurement device and querying the PSS information in the positioning center.

When a PMS is arranged at a base station, an ID of the PMS is a CELL ID of the base station.

When a PMS and a base station are separately arranged, an ID of the PMS is a preset ID associated with a CELL ID of a base station adjacent to the PMS.

It needs to be stated that IDs of the positioning management network elements and the positioning network elements in the embodiment of the present disclosure may be numbered by adopting uniform numbers in the whole network, and may also be numbered by adopting corresponding independent numbers of each positioning management network element and positioning network elements governed thereby, or based on the number and distribution of the positioning network elements in the actual application process according to the components of the network. Any mode is a numbering mode adopted by one skilled in the art according to actual use.

In the embodiment of the present disclosure, under a situation that communication signals are normal, updating of the PSS information is performed and the calculation of location information is performed by the positioning measurement device. And when the positioning measurement device is unable to connect with the communication network, depending on reducing network transmission data, the location calculation is performed by the positioning center, such that the positioning of the positioning measurement device can also be realized when the communication network is not connected.

In the method provided by the embodiment of the present disclosure realizes the positioning of the positioning measurement device, the positioning of the positioning measurement device on a UE side based on the time information about the positioning signals transmitted by each PSS and the PSS information by means of an added preset positioning mode, using a newly added positioning network element, the positioning accuracy of the positioning measurement device is improved, the UE independent positioning is realized under a communication network environment, the dependence on the communication network is reduced and the applicability of positioning of UE based on the communication network is improved.

Figure 3:
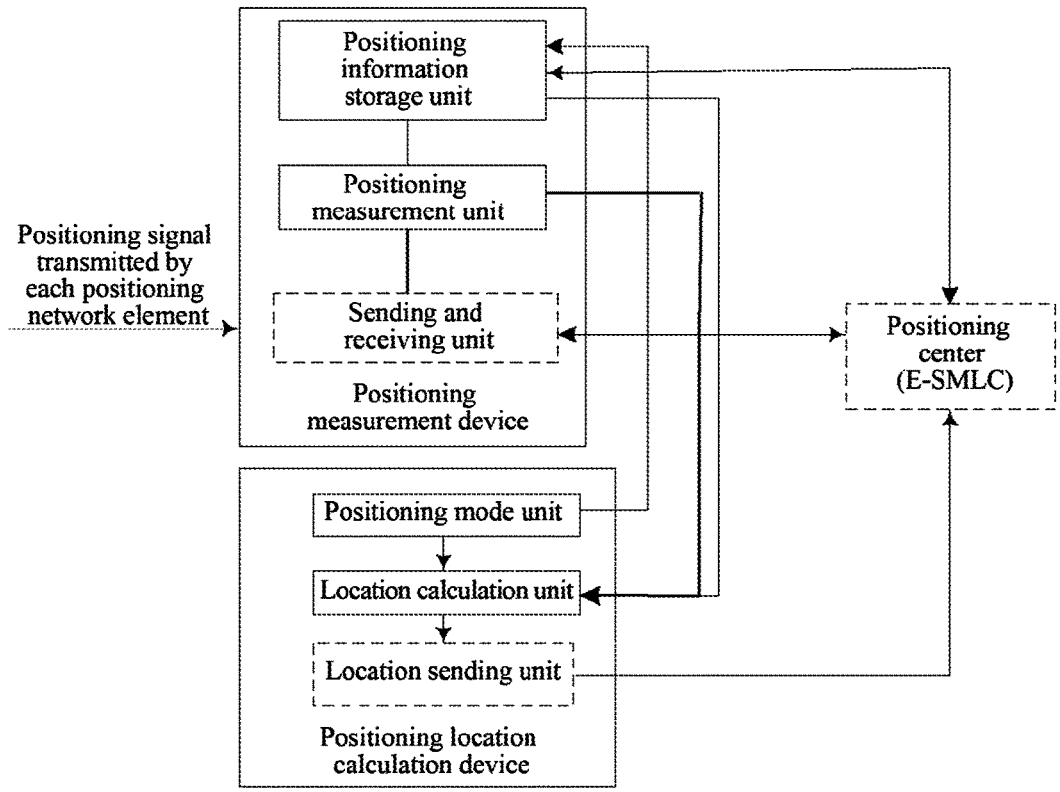
FIG. 3 illustrates a structural diagram of a system for realizing wireless positioning according to an embodiment of the present disclosure.

FIG. 3 illustrates a structural diagram of a system for realizing wireless positioning according to an embodiment of the present disclosure. The system includes a processor, a program memory and a data memory, and further includes a positioning measurement device and a positioning location calculation device.

Herein the positioning measurement device includes a positioning information storage unit and a positioning calculation unit.

The positioning information storage unit is configured to update locally and statically stored positioning network element PSS information according to movement information of the positioning measurement device when network connection is performed.

The positioning measurement unit is configured to receive a positioning signal transmitted by each PSS in a communication network band on a determined wireless resource to obtain time information of the positioning signal transmitted by each PSS and send the time information of the positioning signal transmitted by each PSS to a location calculation unit of the positioning location calculation device according to a preset positioning mode.

The positioning location calculation device includes a positioning mode unit and the location calculation unit.

The positioning mode unit is configured to preset a positioning mode.

The location calculation unit is configured to calculate location information of the positioning measurement device based on the received time information of the positioning signals transmitted by each positioning network element PSS and the PSS information according to the preset positioning mode.

The positioning mode unit is further configured to send the preset positioning mode to the positioning information storage unit of the positioning measurement device for storage.

The positioning information storage unit is further configured to locally and statically store the positioning network element PSS information and the preset positioning mode.

The positioning mode unit is specifically configured to, when the positioning measurement device is able to connect with a network, determine together with a positioning center the preset positioning mode, which is a mode with a realization mode which is Downlink and a realization feature which is UE-based=yes, according to a protocol; or when the positioning measurement device is unable to connect with a network, read the preset positioning mode, which is a mode with a realization mode which is Downlink and a realization feature which is UE-based=yes, from the positioning information storage unit of the positioning measurement device.

The location calculation unit is configured to, when the preset positioning mode is a mode with a realization mode which is Downlink and a realization feature which is UE-based=yes, and when the positioning measurement device is able to connect with the network, calculate the location information of the positioning measurement device based on the received time information of the positioning signal transmitted by each positioning network element (PSS) and the PSS information which is updated by the positioning information storage unit. And when the positioning measurement device is unable to connect with the network, calculate the location information of the positioning measurement device based on the received time information of the positioning signal transmitted by each positioning network element (PSS) and the PSS information which is stored by the positioning information storage unit.

The positioning information storage unit is specifically configured to locally and statically store the positioning network element (PSS) information and the preset positioning mode. When a network is accessed and a positioning request is sent, if a cell identification (CELL ID) of a base station to which the positioning measurement device belongs is different from a CELL ID of a base station to which the positioning measurement device belongs when a positioning request is sent at a previous time, the positioning measurement device sends the CELL ID of the base station to which the positioning measurement device belongs when the positioning request is sent at a current time to a positioning center (E-SMLC), so as to obtain one or more PMS IDs of one or more positioning management network elements (PMSs) from the E-SMLC, and downloads PSS information to perform updating according to the one or more PMS IDs, herein the one or more PMSs are PMSs which are determined by the E-SMLC according to the received CELL ID and to which one or more PSSs with a distance less than a preset threshold to a geographical location of the base station to which the positioning measurement device belongs when the positioning request is sent, respectively belong.

Herein the PSS information is: IDs of one or more PSSs governed by each PMS, location information of the PSSs and/or clock bias information, which are transmitted by each positioning management network element to the E-SMLC for storage; or IDs of one or more PSSs governed by each PMS, location information of the PSSs and/or clock bias information, which are configured by a management maintenance system (OAM) to the E-SMLC for storage.

The system further includes a positioning center, E-SMLC.

The positioning mode unit is further configured to, when the positioning measurement device is connected with a network, determine together with the positioning center the preset positioning mode, which is a mode with a realization mode which is Downlink and a realization feature which is UE-based=no, UE=assisted and E-SMLC-based=yes, according to a protocol, or when the positioning measurement device is unable to connect with a network, obtain the preset positioning mode, which is a mode with a realization mode which is Downlink and a realization feature which is UE-based=no, UE=assisted and E-SMLC-based=yes, from the locally and statically stored positioning mode.

The positioning measurement device further includes a sending and receiving unit configured to, when a network is accessed and a positioning request is sent, if a cell identification (CELL ID) of a base station to which the positioning measurement device belongs is different from a CELL ID of a base station to which the positioning measurement device belongs when a positioning request is sent at a previous time, send the CELL ID of the base station to which the positioning measurement device belongs when the positioning request is sent at a current time to the E-SMLC; and receive ID information, which is obtained by the E-SMLC by querying PSS information according to the received CELL ID, of each PSS governed by each PMS, and send corresponding time information about the positioning signals transmitted by each PSS to the location calculation unit according to the ID of each PSS.

The E-SMLC is configured to query PMS IDs of one or more PMS PMS to which one or more PSSs with a distance that is less than a preset threshold to a geographical location of the base station to which the positioning measurement device belongs when the positioning request is sent, respectively belong, according to the CELL ID sent by the sending and receiving unit of the positioning measurement device, and send the information of a PSS ID of each PSS respectively governed by the one or more PMSs to the sending and receiving unit of the positioning measurement device; query corresponding location information of and/or clock bias information each PSS from the PSS information stored in the positioning center according to the IDs of the one or more PSSs; and calculate the location information of the positioning measurement device based on the time information about the positioning signals transmitted by each PSS and the queried location information and/or clock bias information.

Herein the PSS information is: IDs of one or more PSSs governed by each PMS, location information of the PSSs and/or clock bias information, which are transmitted by each positioning management network element to the E-SMLC for storage; or IDs of one or more PSSs governed by each PMS, location information of the PSSs and/or clock bias information, which are configured by a management maintenance system (OAM) to the E-SMLC for storage.

The positioning location calculation device further includes a location sending unit configured to, if a positioning request is not a positioning request initiated by the positioning measurement device aiming at the positioning measurement device, set the positioning measurement device to send the location information to the E-SMLC; and if a positioning request is a positioning request initiated by the positioning measurement device aiming at the positioning measurement device, set the positioning measurement device to not send the location information to the E-SMLC.

The location sending unit is further configured to set the E-SMLC to send the location information to the positioning measurement device which initiates the positioning request or other terminals.

The positioning information storage device is a nonvolatile storage device which is still capable of saving PSS information and set positioning mode information during power outage.

It needs to be stated that, the location calculation unit may be arranged in the positioning measurement device and may also be arranged in the positioning center according to the actual application, and specific situations may be determined according to the network connection situation, the positioning mode and the like.

An embodiment of the present disclosure further provides a positioning location calculation device for realizing wireless positioning. The device includes a processor, a program memory and a data memory, and further includes a positioning mode unit and a location calculation unit, The positioning mode unit is configured to preset a positioning mode.

The positioning mode unit is specifically configured to, when the positioning measurement device is able to connect with a network, determine together with a positioning center the preset positioning mode, which is a mode with a realization mode which is Downlink and a realization feature which is UE-based=yes, according to a protocol; or when the positioning measurement device is unable to connect with a network, read the preset positioning mode, which is a mode with a realization mode which is Downlink and a realization feature which is UE-based=yes, from a positioning information storage unit of the positioning measurement device.

The location calculation unit is configured to calculate location information of a positioning measurement device based on received time information of the positioning signal transmitted by each positioning network element (PSS) and PSS information according to the determined positioning mode.

The location calculation unit is configured to, when the preset positioning mode is a mode with a realization mode which is Downlink and a realization feature which is UE-based=yes, and when the positioning measurement device is able to connect with the network, calculate the location information of the positioning measurement device based on the received time information of the positioning signal transmitted by each positioning network element (PSS) and the PSS information which is updated by the positioning information storage unit; and when the positioning measurement device is unable to connect with the network, calculate the location information of the positioning measurement device based on the received time information of the positioning signal transmitted by each positioning network element (PSS) and the PSS information which is stored by the positioning information storage unit.

The positioning mode unit is further configured to, when the positioning measurement device is able to with a network, determine together with a positioning center the preset positioning mode, which is a mode with a realization mode which is Downlink and a realization feature which is UE-based=no, UE=assisted and E-SMLC-based=yes, according to a protocol; and when the positioning measurement device is unable to connect with a network, read the preset positioning mode, which is a mode with a realization mode which is Downlink and a realization feature which is UE-based=no, UE=assisted and E-SMLC-based=yes, from the positioning information storage unit.

The location calculation unit is configured to, when the positioning mode is a mode with a realization mode which is Downlink and a realization feature which is UE-based=no, UE=assisted and E-SMLC-based=yes, determine the positioning center to calculate the location information of the positioning measurement device based on time information of positioning signal transmitted by each positioning network element (PSS) and PSS information.

The positioning location calculation device further includes a location sending unit adapted to, if a positioning request is not a positioning request initiated by the positioning measurement device aiming at the positioning measurement device, send the location information to the E-SMLC; otherwise, set the positioning measurement device to not send the location information to the E-SMLC.

The location sending unit is further configured to set the E-SMLC to send the location information to the positioning measurement device which initiates the positioning request or other terminals.

Embodiment 1

In the embodiment, clock bias correction, i.e., a clock synchronization process in step 401, is performed on a positioning measurement device, each positioning network element and each positioning management network element, therefore, positioning network element information may not include clock bias information.

Figure 4:
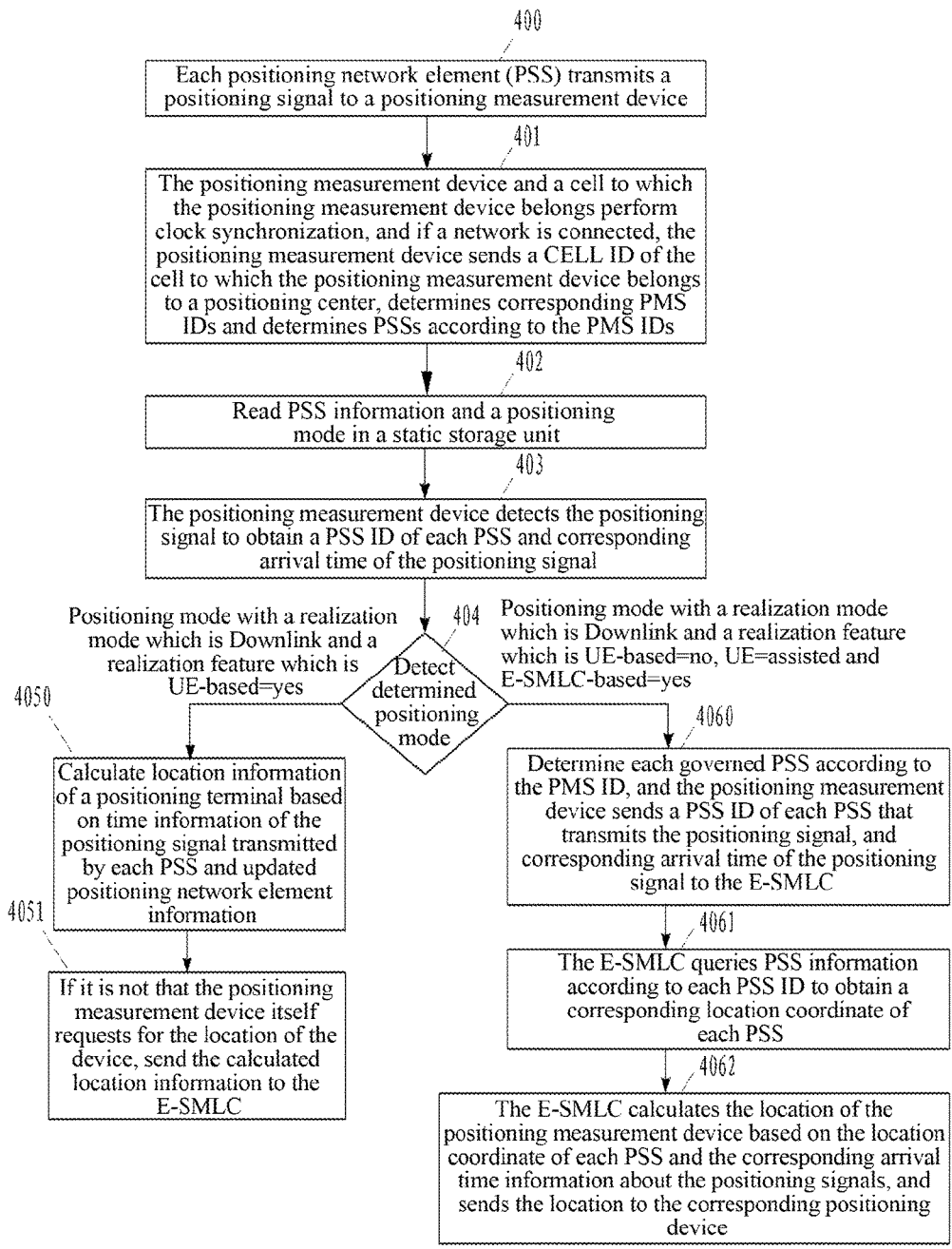
FIG. 4 illustrates a flowchart of a method according to embodiment 1 of the present disclosure.

FIG. 4 illustrates a flowchart of a method according to embodiment 1 of the present disclosure. As illustrated in FIG. 4, the method includes steps 400-404, 4050-4051 and 4060-4062.

In step 400, each positioning network element (PSS) transmits a positioning signal to a positioning measurement device.

In step 401, the positioning measurement device and a cell to which the positioning measurement device belongs perform clock synchronization, and if a network is connected, the positioning measurement device sends a CELL ID of the cell to which the positioning measurement device belongs to a positioning center, determines corresponding one or more PMS IDs and determines each governed PSS according to the one or more PMS IDs.

In step 402, PSS information and a positioning mode in a static storage unit are read.

In step 403, the positioning measurement device detects the positioning signal to obtain a PSS ID of each PSS and corresponding arrival time.

In step 404, the positioning mode is detected, and when the positioning mode is a positioning mode with a realization mode which is Downlink and a realization feature which is UE-based=yes, steps 4050-4051 are executed; and when the positioning mode is a positioning mode with a realization mode which is Downlink and a realization feature which is UE-based=no, UE=assisted and E-SMLC-based=yes, steps 4060-4062 are executed.

In step 4050, location information of a positioning terminal is calculated based on time information of the positioning signal transmitted by each PSS and updated positioning network element information.

In step 4051, if it is not that the positioning measurement device itself requests for the location of the device, the calculated location information is sent to the E-SMLC.

In step 4060, each governed PSS is determined according to the PMS ID, and the positioning measurement device sends a PSS ID of each PSS that transmits the positioning signal and corresponding arrival time of the positioning signal to the E-SMLC.

In step 4061, the E-SMLC queries the PSS information according to each PSS ID to obtain a corresponding location coordinate of each PSS.

In step 4062, the E-SMLC calculates the location of the positioning measurement device based on the location coordinate of each PSS and the corresponding arrival time information of the positioning signal transmitted by each PSS, and sends the location to the corresponding positioning device.

Figure 5:
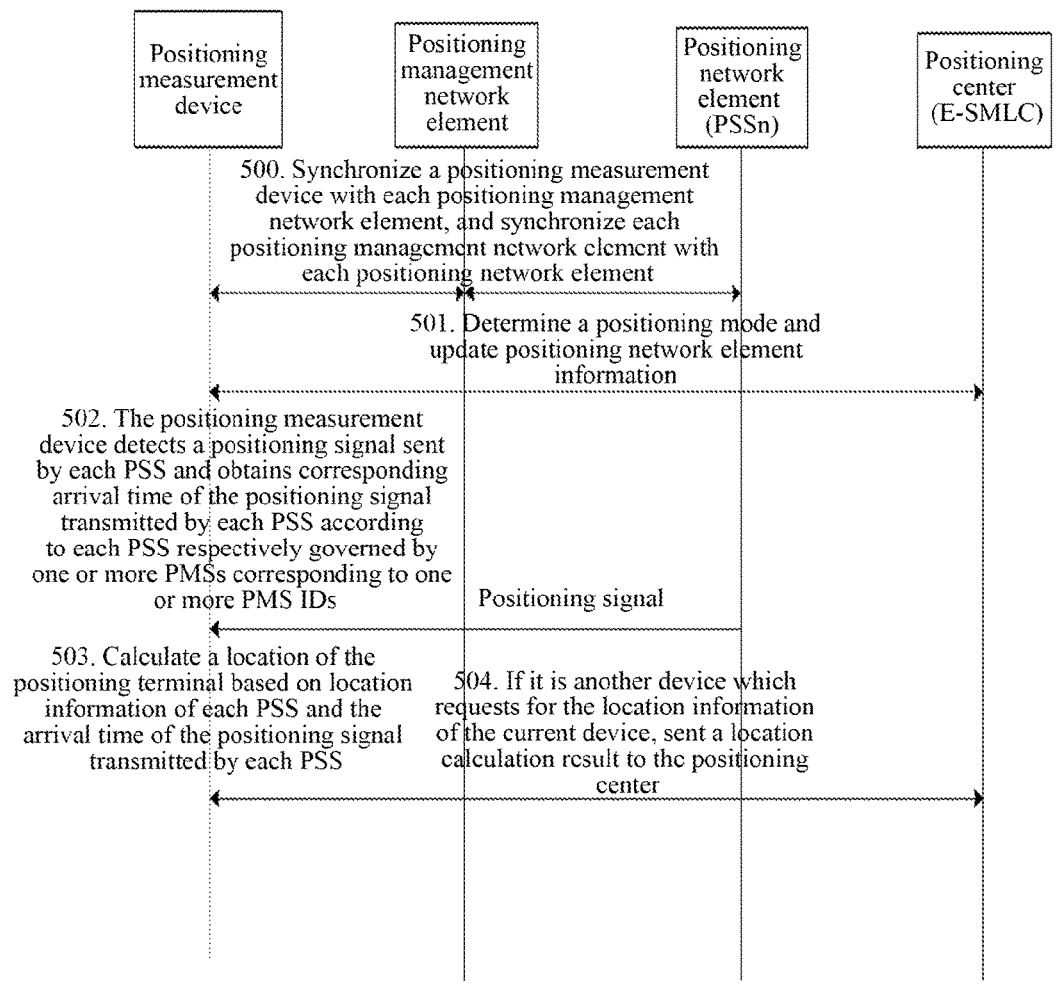
FIG. 5 illustrates a flowchart of one positioning mode in embodiment 1 of the present disclosure.

FIG. 5 illustrates a flowchart of one positioning mode in embodiment 1 of the present disclosure. As illustrated in FIG. 5, when the positioning mode is a positioning mode with a realization mode which is Downlink and a realization feature which is UE-based=yes, the method includes the following steps 500-501.

In step 500, a positioning measurement device, each positioning network element and each positioning management network element perform clock synchronization.

In step 501, a positioning mode is set, the positioning measurement device receives a positioning request, and if a terminal accesses to a network, the positioning measurement device sends a CELL ID of a base station to which the positioning measurement device belongs to a positioning center, the positioning center determine one or more corresponding PMS IDs according to the received CELL ID and notifies the positioning measurement device, and the positioning measurement device updates locally and statically stored PSS information according to each PSS respectively governed by one or more PMS IDs.

In step 502, the positioning measurement device detects the positioning signal sent by each positioning network element and obtains corresponding arrival time of the positioning signal transmitted by each PSS according to each PSS respectively governed by the one or more PMSs.

In step 503, the positioning measurement device calculates a location of the positioning measurement device based on location information of each PSS corresponding to the PSS ID of each PSS and the arrival time of the positioning signals transmitted by each PSS.

If the positioning request is initiated by the positioning measurement device itself, the positioning measurement device does not send the location information to the positioning center; and if the positioning request is initiated by other terminals instead of the positioning measurement device, the positioning measurement device sends the location information to the positioning center.

Figure 6:
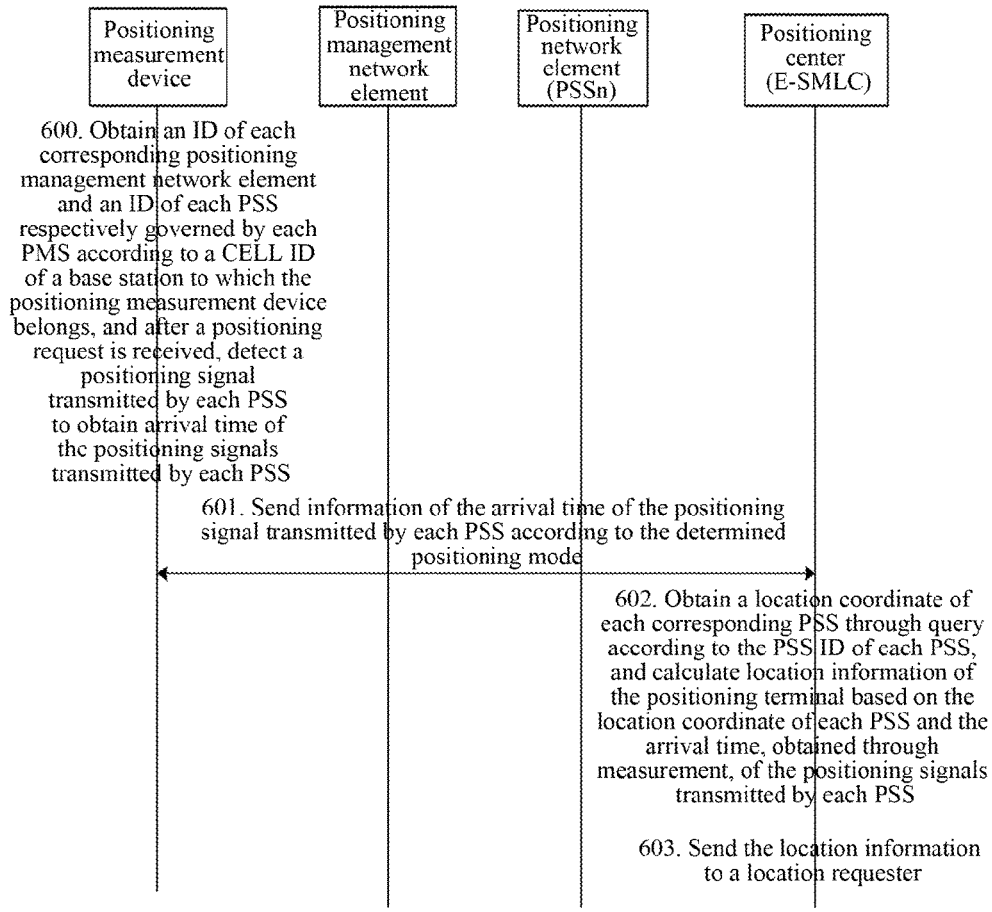
FIG. 6 illustrates a flowchart of another positioning mode in embodiment 1 of the present disclosure.

FIG. 6 illustrates a flowchart of another positioning mode in embodiment 1 of the present disclosure. As illustrated in FIG. 6, the positioning mode in the embodiment is a mode with a realization mode which is Downlink and a realization feature which is UE-based=no and (UE-assisted, E-SMLC-based)=yes, the embodiment stills adopts a synchronization mode to perform clock synchronization.

In step 600, a positioning measurement device receives a positioning request, the positioning measurement device obtains one or more corresponding PMS ID and each PSS governed by each PMS corresponding to the one or more PMS ID from a positioning center according to a CELL ID of a base station to which the positioning measurement device belongs when a network is accessed and the positioning request is sent, and detects a positioning signal transmitted by each PSS and obtains arrival time of the positioning signal transmitted by each PSS.

In step 601, the positioning measurement device sends the arrival time, obtained according to the CELL ID, of the positioning signal transmitted by each PSS respectively governed by one or more PMS to the positioning center according to the positioning mode in the embodiment.

In step 602, the positioning center queries pre-stored positioning network element information (existing positioning network element data blocks) according to the PSS ID, obtained according to the received CELL ID, of each PSS governed by one or more corresponding PMSs to obtain a corresponding location coordinate of each PSS, and calculates location information of the positioning measurement device based on the location coordinate of each PSS and the measured arrival time of the positioning signal transmitted by each PSS.

In step 603, the positioning center sends the location information to a positioning requester.

Embodiment 2

In the embodiment, each positioning network element is arranged in a base station and a positioning measurement device entering a network initiates a positioning request.

Figure 7:
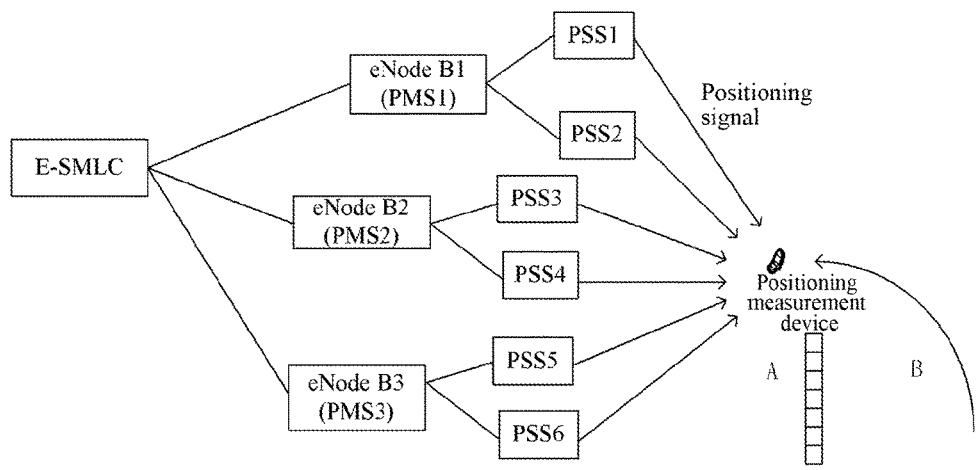
FIG. 7 illustrates a structural schematic diagram of a network according to embodiment 2 of the present disclosure.

FIG. 7 illustrates a structural schematic diagram of a network according to embodiment 2 of the present disclosure. As illustrated in FIG. 7, the network includes a positioning center (E-SMLC), three positioning management network elements PMS1, PMS2, PMS3 which are respectively shared with three base station eNodeB1, eNodeB2, eNodeB3, and positioning network elements which are respectively PSS1, PSS2, PSS3, PSS4, PSS5, PSS6.

In the embodiment, it is supposed that there is no information (i.e., information stored before power-off at a previous time) in a positioning information storage unit of the positioning measurement device and the positioning measurement device moves from a communication blind point B to a point A. It is supposed that the positioning measurement device is powered on at the point B and positioning network element information thereof is empty. It may also be supposed that the positioning network element information is positioning network element information obtained during positioning before power-on. In the embodiment, in order to describe a request process of positioning network element information, it is supposed that the positioning network element information is empty. A set positioning mode is a mode with a realization mode which is Downlink and a realization feature which is UE-based=yes.

When the positioning measurement device is at the communication blind area B, since communication cannot be realized, the positioning measurement device cannot complete a positioning process thereof.

When the positioning measurement device moves to the point A, it can receive signals from base station. It is supposed that a base station to which the positioning measurement device belongs at that moment is eNodeB1.

An execution process of the positioning mode with the realization mode which is Downlink and the realization feature which is UE-based=yes in this embodiment will be described below.

The positioning measurement device accesses a network through the eNodeB1, and sends a CELL ID of the base station to which the positioning measurement device belongs to the E-SMLC, so as to update locally and statically stored positioning network element information according to the CELL ID. In the embodiment, the locally and statically stored positioning network element information specifically includes: location information and clock bias information of PSS1 managed by PMS1; and location information and clock bias information of PSS2, location information and clock bias information of PSS3 managed by PMS2; and location information and clock bias information of PSS4, and location information and clock bias information of PSS5 managed by PMS3; and location information and clock bias information of PSS6.

The positioning measurement device receives the positioning signal and obtains an ID of each positioning management network element and arrival time of the positioning signal transmitted by each PSS governed by each positioning management network element, and the arrival time of the positioning signals transmitted by each PSS is distinguished and recorded through the PSS ID. In this embodiment, the positioning measurement device detects the PMS ID, the PSS IDs of the PSSi (i is from 1 to 6) and the arrival time of the positioning signal transmitted by the corresponding PSSs.

According to the positioning mode in the embodiment, the positioning measurement device detects and obtains location information and clock bias information of each positioning network element according to the recorded PMS ID and the PSS ID.

According to the obtained location information and clock bias information of each PSS and the arrival time, obtained while receiving the positioning signal, of the positioning signals transmitted by each PSS, the positioning measurement device calculates the location of the positioning measurement device.

In the embodiment, since the request for positioning the positioning measurement device is initiated by the positioning measurement device, the location information is no need to be sent to the E-SMLC.

Embodiment 3

In the embodiment, each positioning network element is arranged in a base station and a positioning measurement device which enters a network initiates a positioning request.

Figure 8:
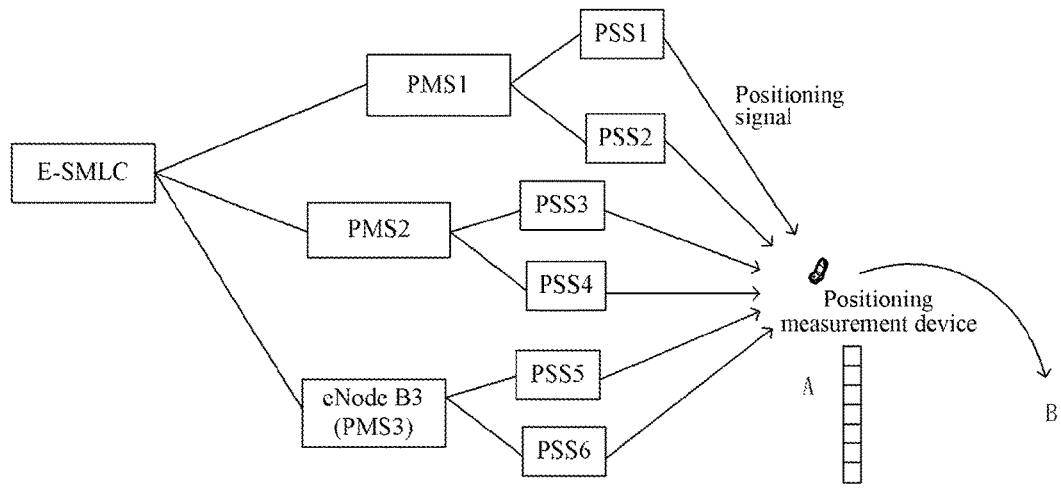
FIG. 8 illustrates a structural schematic diagram of a network according to embodiment 3 of the present disclosure.

FIG. 8 illustrates a structural schematic diagram of a network according to embodiment 3 of the present disclosure. As illustrated in FIG. 8, the network includes a positioning center (E-SMLC), three positioning management network elements PMS1, PMS2, PMS3, herein PMS3 is shared with a base station eNodeB3 in the network; and positioning network elements which are respectively PSS1, PSS2, PSS3, PSS4, PSS5, PSS6.

In the embodiment, the positioning measurement device moves from a communication blind point B (an area in which communication signals of eNodeB1, eNodeB2 and eNodeB3 cannot be received) to a point A. In the embodiment, positioning network element information obtained in embodiment 1 is adopted. A set positioning mode is a mode with a realization mode which is Downlink and a realization feature which is UE-based=yes.

When the positioning measurement device moves to the point A, the positioning measurement device can receive signals from the base station. It is supposed that the base station to which the positioning measurement device belongs at this moment is eNodeB3.

An execution process of the positioning mode with the realization mode which is Downlink and the realization feature which is UE-based=yes in this embodiment will be described below.

The positioning measurement device at the point A accesses the network through eNodeB3, sends a CELL ID of the base station to which the positioning measurement device belongs to the positioning center (E-SMLC), obtains corresponding PMS IDs according to the CELL ID and downloads information of positioning network elements governed by the PMSs according to the PMS IDs. In the embodiment, the downloaded positioning network element information includes: location information and clock bias information of PSS1 managed by PMS1; and location information and clock bias information of PSS2, location information and clock bias information of PSS3 managed by PMS2; and location information and clock bias information of PSS4, and location information and clock bias information of PSS5 managed by PMS3; and location information and clock bias information of PSS6.

The positioning measurement device locally and statically stores the information (supposed to be dynamic positioning network element information).

The positioning measurement device at the point B cannot access the network. It is supposed that the positioning measurement device still can receive enough positioning signals transmitted by the PSSs. A process that the positioning measurement device initiates the positioning request at this moment will be described below.

The positioning measurement device detects the positioning signal and obtains an ID of each PSS governed by each PMS corresponding to each PMS ID corresponding to the CELL ID, and arrival time of the positioning signal transmitted by each PSS In the embodiment, the positioning measurement device detects each PMS ID and the arrival time of the positioning signals transmitted by the PSSi (i is from 1 to 6).

According to the positioning mode in the embodiment, the positioning measurement device searches to obtain location information and clock bias information of each PSS according to the recorded each PMS ID and each PSS ID.

In this embodiment, the location information and clock bias information of the PSSi (i is from 1 to 6) are searched in the dynamic positioning network element information through the PMS ID and the PSS ID.

According to the obtained location information and clock bias information of each PSS and the arrival time, obtained while receiving the positioning signals, of the positioning signals transmitted by each PSS, the positioning measurement device calculates the location of the positioning measurement device.

In the embodiment, since the request for positioning the positioning measurement device is initiated by the terminal itself, the location information is no need to be sent to the E-SMLC.

Embodiment 4

Each positioning network element is arranged in a base station, a LoCation Services (LCS) terminal initiates a positioning request to a positioning measurement device.

Figure 9:
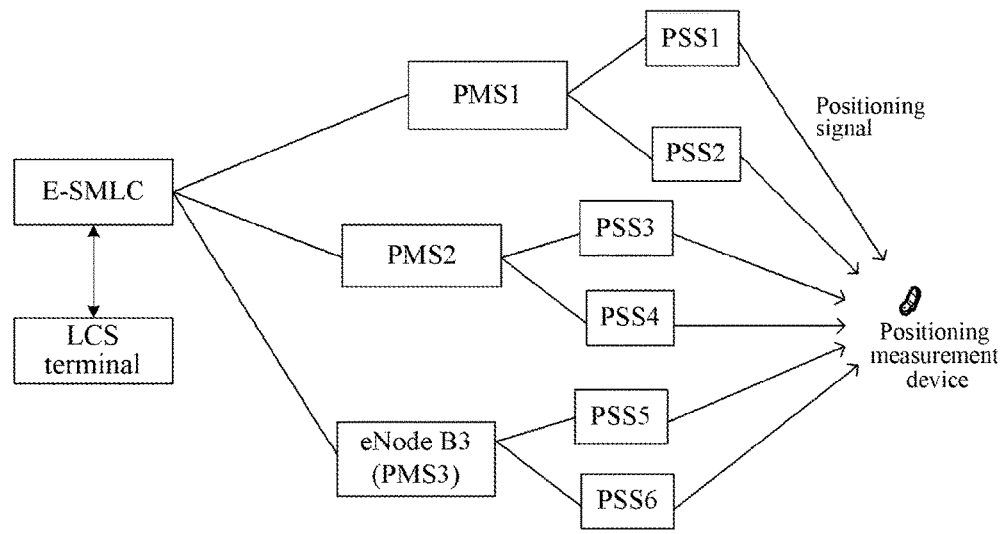
FIG. 9 illustrates a structural schematic diagram of a network according to embodiment 4 of the present disclosure.

FIG. 9 illustrates a structural schematic diagram of a network according to embodiment 4 of the present disclosure. As illustrated in FIG. 9, the network includes a positioning center (E-SMLC), three positioning management network elements PMS1, PMS2, PMS3, herein PMS3 is shared with a base station eNodeB3 in the network; and positioning network elements which are respectively PSS1, PSS2, PSS3, PSS4, PSS5, PSS6.

In the embodiment, the positioning measurement device accesses the network through eNodeB3 and the set positioning mode is a mode with a realization mode which is Downlink and a realization feature which is UE-based=yes. A basic process that an external LCS terminal initiates a positioning request to the positioning measurement device will be described below.

The positioning measurement device at the point A accesses the network through eNodeB3, sends a CELL ID of the base station to which the positioning measurement device belongs to the E-SMLC and updates locally and statically stored PSS information according to the CELL ID of the base station to which the positioning measurement device belongs, and obtains PMS IDs corresponding to the CELL ID.

In the embodiment, the PSS information specifically includes: location information and clock bias information of PSS1 managed by PMS1; and location information and clock bias information of PSS2, location information and clock bias information of PSS3 managed by PMS2; and location information and clock bias information of PSS4, and location information and clock bias information of PSS5 managed by PMS3; and location information and clock bias information of PSS6.

The positioning measurement device locally and statically stores the information.

The positioning measurement device detects positioning signals and obtains a PSS ID of each PSS and arrival time of the positioning signal transmitted by each PSS, i.e., PSS IDs of PSSi (i is 1 to 6) and arrival time of the positioning signals transmitted in the embodiment.

According to the positioning mode in the embodiment, the positioning measurement device detects PSS information according to each recorded PMS ID and PSS ID to obtain location information and clock bias information of each PSS.

According to the obtained location information and clock bias information of each PSS and the arrival time, obtained while receiving the positioning signals, of the positioning signals transmitted by each PSS, the positioning measurement device calculates the location of the positioning measurement device.

In the embodiment, since the request for positioning the positioning measurement device is initiated by the LCS terminal, the terminal sends the location information to the E-SMLC.

One skilled in the art can understand that all or partial steps in the above-mentioned embodiments may be implemented by using a computer program process, the computer program may be stored in a computer-readable storage medium, the computer program is executed on a corresponding hardware platform (e.g., a system, equipment, an apparatus or a device), and when being executed, it includes one or combinations of the steps of the method embodiments.

In an exemplary embodiment, all or partial steps in the above-mentioned embodiments may also be implemented by using integrated circuits, and these steps may be respectively manufactured into integrated circuit modules, or more modules or steps thereof may be manufactured into a single integrated circuit module to implement. Therefore, the present disclosure is not limited to any specific combinations of hardware and software.

Each device/function module/function unit in the above-mentioned embodiments may be implemented by adopting a general-purpose computing device, and they may be integrated on a single computing device and may also be distributed on a network consisting of a plurality of computing devices.

When each device/function module/function unit in the above-mentioned embodiments is implemented by means of software function module and is sold or used as an independent product, it may be stored in a computer-readable storage medium. The above-mentioned computer-readable storage medium may be a read-only memory, a magnetic disk, a compact disk or the like.

One skilled in the art may easily conceive of variations or replacements within the technical scope disclosed by the present disclosure, which, however, shall be all included in the protection scope of the present disclosure. Therefore, the protection scope of the present disclosure shall be subjected to the protection scope of the claims.

INDUSTRIAL APPLICABILITY

In the technical solution provided by the embodiments of the present disclosure, the positioning of the positioning measurement device on a UE side based on the time information about the positioning signals transmitted by each PSS and the PSS information is realized by means of added positioning modes, and using positioning network elements to perform the positioning of the positioning measurement device, the positioning accuracy and applicability of communication network-based positioning are improved, and the dependence of positioning on the communication network is reduced.

What we claim is:

1. A method for realizing wireless positioning, comprising:
    updating, by a positioning measurement device, locally and statically stored positioning network element, PSS, information according to movement information of the positioning measurement device when a network connection is performed;
    receiving, by the positioning measurement device, a positioning signal transmitted by each PSS in a band of a communication network on determined wireless resources, obtaining time information of the positioning signal transmitted by each PSS; and
    calculating location information of the positioning measurement device based on the time information of the positioning signal transmitted by each PSS and the PSS information according to a preset positioning mode.

2. The method according to claim 1, wherein the method previously further comprises: locally and statically storing the PSS information and the positioning mode in the positioning measurement device.

3. The method according to claim 2, wherein the positioning mode comprises:
    a mode with a realization mode which is Downlink and a realization feature which is UE-based=yes;

when the positioning measurement device performs network connection, the positioning measurement device determines together with a positioning center the positioning mode according to a protocol and locally and statically stores the positioning mode; and wherein calculating location information of the positioning measurement device specifically comprises:

calculating, by the positioning measurement device, the location information of the positioning measurement device based on the obtained time information of the positioning signals transmitted by each PSS and the locally and statically stored PSS information which is updated by the positioning measurement device; or when the positioning measurement device is unable to perform the network connection, obtaining, by the positioning measurement device, the positioning mode from the locally and statically stored positioning mode; and wherein calculating location information of the positioning measurement device specifically comprises:

the positioning measurement device calculating the location information of the positioning measurement device based on the obtained time information of the positioning signals transmitted by each PSS and the locally and statically stored PSS information in the positioning measurement device.

4. The method according to claim 1, wherein the movement information of the positioning measurement device is a cell identification, CELL ID, of a base station to which the positioning measurement device belongs; and wherein updating the locally and statically stored PSS information comprises:

when the positioning measurement device accesses to a network and sends a positioning request, if the cell identification, CELL ID, of the base station to which the positioning measurement device belongs is different from a CELL ID of a base station to which the positioning measurement device belongs when the positioning measurement device sends a positioning request at a previous time, sending, by the positioning measurement device, the CELL ID of the base station to which the positioning measurement device belongs when the positioning request is sent at a current time to a positioning center, E-SMLC, to obtain one or more PMS IDs of one or more positioning management network elements PMSs from the E-SMLC, and downloading PSS information to perform updating according to the one or more PMS IDs, wherein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong; and wherein the PSS information is:

IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system, OAM, to the E-SMLC for storage.

5. The method according to claim 2, wherein the positioning mode further comprises: a mode with a realization mode which is Downlink and a realization feature which is UE-based=no, UE=assisted and positioning center E-SMLC-based=yes;

when the positioning measurement device performs the network connection, the positioning measurement device determines together with a positioning center the positioning mode according to a protocol and locally and statically stores the positioning mode; or when the positioning measurement device is unable to perform network connection, the positioning measurement device obtaining the positioning mode from the locally and statically stored positioning mode; and if the movement information of the positioning measurement device is a CELL ID of a base station to which the positioning measurement device belongs, the method further comprises:

when the positioning measurement device accesses to a network and sends a positioning request, if the cell identification CELL ID of the base station to which the positioning measurement device belongs is different from a CELL ID of a base station to which the positioning measurement device belongs when the positioning measurement device sends a positioning request at a previous time, sending, by the positioning measurement device, the CELL ID of the base station to which the positioning measurement device belongs when the positioning request is sent at a current time to the positioning center, E-SMLC to obtain one or more PMS IDs of one or more positioning management network elements, PMSs, from the E-SMLC, and downloading PSS information to perform updating according to the one or more PMS IDs, wherein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong; and wherein the PSS information is: IDs of one or more PSSs governed by each PMS, location information of the PSSs and/or clock bias information, which are transmitted by each PMS to the E-SMLC for storage; or IDs of one or more PSSs governed by each PMS, location information of the PSSs and/or clock bias information, which are configured by a management maintenance system, OAM, to the E-SMLC for storage; and sending, by the positioning measurement device, the obtained corresponding time information of the positioning signal transmitted by each PSS to the E-SMLC according to each PSS ID determined by the E-SMLC, and querying, by the E-SMLC, corresponding location information of and/or clock bias information of each PSS from the PSS information stored in the E-SMLC according to each PSS ID; and calculating the location information of the positioning measurement device based on the time information of the positioning signal transmitted by each PSS and the queried corresponding location information and/or clock bias information of each PSS.

6. The method according to claim 5, wherein the method further comprises: storing, by the positioning measurement device, the CELL ID of the base station to which the positioning measurement device belongs when the positioning request is sent, and the corresponding PSS ID, obtained according to the CELL ID, of each PSS respectively governed by one or more PMSs;

when the CELL ID of the base station to which the positioning measurement device belongs is the same with the stored CELL ID of the base station to which the positioning measurement device belongs when the positioning request is sent, sending, by the positioning measurement device, the obtained corresponding time information of the positioning signal transmitted by each PSS to the E-SMLC according to each PSS ID; and querying, by the E-SMLC, the corresponding location information and/or clock bias information of each PSS from the PSS information stored in the E-SMLC according to each PSS ID; and calculating the location information of the positioning measurement device based on the time information about the positioning signals transmitted by each PSS and the queried corresponding location information and/or clock bias information of each PSS;

or the method further comprises:

when the preset positioning mode is a mode with a realization mode which is Downlink and a realization feature which is UE-based=no, UE=assisted and positioning center E-SMLC-based=yes, sending, by the E-SMLC, the calculated location information of the positioning measurement device to the positioning measurement device which initiates the positioning request or other terminals.

7. The method according to claim 1, wherein the method further comprises:

when the preset positioning mode is a mode with a realization mode which is Downlink and a realization feature which is UE-based=yes, if a positioning request is not a positioning request initiated by the positioning measurement device aiming at the positioning measurement device, sending, by the positioning measurement device, the location information to the E-SMLC; and if a positioning request is a positioning request initiated by the positioning measurement device aiming at the positioning measurement device, not sending, by the positioning measurement device, the location information to the E-SMLC.

8. The method according to claim 4, wherein, when a PMS is arranged at a base station, an ID of the PMS is a CELL ID of the base station;

when a PMS and a base station are separately arranged, an ID of the PMS is a preset ID associated with a CELL ID of a base station adjacent to the PMS.

9. The method according to claim 1, wherein the time information of the positioning signal transmitted by the PSS specifically comprises:

corresponding arrival time, received by the positioning measurement device on the determined wireless resources according to an ID of each PSS, of the positioning signal transmitted by each PSS;

or the determined wireless resources are: wireless resources used by each PSS for transmitting the positioning signal;

or the clock bias information comprises: clock bias information of each PSS relative to a reference clock, and/or clock bias information between PMSs;

if the positioning signals transmitted by each PSS have already been corrected according to the reference clock, the clock bias information does not comprise the clock bias information of each PSS relative to the reference clock; and if clocks between PMSs has already been corrected, the clock bias information does not comprise the clock bias information between PMSs.

10. A system for realizing wireless positioning, comprising a positioning measurement device and a positioning location calculation device, wherein, the positioning measurement device comprises a positioning information storage unit and a positioning calculation unit, wherein, the positioning information storage unit is configured to update locally and statically stored positioning network element, PSS, information according to movement information of the positioning measurement device when a network connection is performed; and the positioning measurement unit is configured to receive a positioning signal transmitted by each PSS in a band of a communication network on determined wireless resources to obtain time information of the positioning signal transmitted by each PSS; and send the time information of the positioning signal transmitted by each PSS to a location calculation unit according to a preset positioning mode; and the positioning location calculation device comprises a positioning mode unit and a location calculation unit, wherein, the positioning mode unit is configured to preset a positioning mode; and the location calculation unit is configured to calculate location information of the positioning measurement device based on the received time information of the positioning signals transmitted by each positioning network element, PSS, and the PSS information according to the preset positioning mode.

11. The system according to claim 10, wherein the positioning mode unit is further configured to send the preset positioning mode to the positioning information storage unit for storage; and the positioning information storage unit is further configured to locally and statically store the positioning network element, PSS, information and the preset positioning mode.

12. The system according to claim 10, wherein the positioning mode unit is configured to, when the positioning measurement device is able to connect with a network, determine together with a positioning center the preset positioning mode according to a protocol; or when the positioning measurement device is unable to connect with a network, read the preset positioning mode from the positioning information storage unit, wherein the preset positioning mode is: a mode with a realization mode which is Downlink and a realization feature which is UE-based=yes; and the location calculation unit is configured to, according to the preset positioning mode, when the positioning measurement device is able to connect with the network, calculate the location information of the positioning measurement device based on the received time information of the positioning signal transmitted by each positioning network element, PSS, and the PSS information which is updated by the positioning information storage unit; and when the positioning measurement device is unable to connect with the network, calculate the location information of the positioning measurement device based on the received time information of the positioning signal transmitted by each positioning network element, PSS, and the PSS information which is stored by the positioning information storage unit.

13. The system according to claim 10, wherein,
the positioning information storage unit is configured to locally and statically store the positioning network element, PSS, information and the preset positioning mode; when a network is accessed and a positioning request is sent, if a cell identification CELL ID of a base station to which the positioning measurement device belongs is different from a CELL ID of a base station to which the positioning measurement device belongs when the positioning measurement device sends a positioning request at a previous time, the positioning measurement device sends the CELL ID of the base station to which the positioning measurement device belongs when the positioning request is sent at a current time to the positioning center, E-SMLC to obtain one or more PMS IDs of one or more positioning management network elements, PMSs, from the E-SMLC, and downloads PSS information to perform updating according to the one or more PMS IDs, wherein the one or more PMSs are PMSs which are determined by the E-SMLC according to the received CELL ID and to which one or more PSSs with a distance that is less than a preset threshold to a geographical location of the base station to which the positioning measurement device belongs when the positioning request is sent, respectively belong; and
wherein the PSS information is:
IDs of one or more PSSs governed by each PMS, location information of the PSSs and/or clock bias information, which are transmitted by each PMS to the E-SMLC for storage; or
IDs of one or more PSSs governed by each PMS, location information of the PSSs and/or clock bias information, which are configured by a management maintenance system, OAM, to the E-SMLC for storage,
wherein the positioning location calculation device further comprises a location sending unit configured to set the E-SMLC to send the calculated location information of the positioning measurement device to the positioning measurement device which initiates the positioning request or other terminals.

14. The system according to claim 10, wherein the system further comprises a positioning center, E-SMLC;
the positioning mode unit is further configured to, when the positioning measurement device is connected with a network, determine together with the E-SMLC the preset positioning mode according to a protocol; or
when the positioning measurement device is unable to connect with a network, obtain the preset positioning mode from the locally and statically stored positioning mode,
wherein the preset positioning mode is: a mode with a realization mode which is Downlink and a realization feature which is UE-based=no, UE=assisted and positioning center E-SMLC-based=yes;
the positioning measurement device further comprises a sending and receiving unit configured to, when accessing to a network and sending a positioning request, if a cell identification, CELL ID, of a base station to which the positioning measurement device belongs is different from a CELL ID of a base station to which the positioning measurement device belongs when the positioning measurement device sends a positioning request at a previous time, send the CELL ID of the base station to which the positioning measurement device belongs when a positioning request is sent at a current time to the E-SMLC; and receive ID information, which is obtained by the E-SMLC by querying the PSS information, of each PSS respectively governed by one or more PMSs, and send corresponding time information of the positioning signal transmitted by each PSS to the location calculation unit according to the ID of each PSS;
the E-SMLC is configured to determine a PMS ID of each PMS to which one or more PSSs with a distance that is less than a preset threshold to a geographical location of the base station corresponding to the CELL ID, respectively belong, according to the CELL ID sent by the sending and receiving unit, query PSS information according to each PMS ID to obtain information of a PSS ID of each PSS respectively governed by each PMS, and send the information to the sending and receiving unit; query corresponding location information and/or clock bias information of each PSS from the PSS information stored in the E-SMLC according to the PSS ID of each PSS; and calculate the location information of the positioning measurement device based on the time information about the positioning signal transmitted by each PSS and the queried corresponding location information and/or clock bias information of each PSS; and
wherein the PSS information is: IDs of one or more PSSs governed by each PMS, location information of the PSSs and/or clock bias information, which are transmitted by each PMS to the E-SMLC for storage; or
IDs of one or more PSSs governed by each PMS, location information of the PSSs and/or clock bias information, which are configured by a management maintenance system, OAM, to the E-SMLC for storage;
or
wherein the positioning location calculation device further comprises a location sending unit configured to, if a positioning request is not a positioning request initiated by the positioning measurement device aiming at the positioning measurement device, send the location information to the E-SMLC; and if a positioning request is a positioning request initiated by the positioning measurement device aiming at the positioning measurement device, not send the location information to the E-SMLC;
or
wherein the positioning information storage device is a nonvolatile storage device which is still capable of saving PSS information and set positioning mode information during power outage.

15. A positioning location calculation device for realizing wireless positioning, comprising: a positioning mode unit and a location calculation unit, wherein,
the positioning mode unit is configured to preset a positioning mode; and
the location calculation unit is configured to calculate location information of a positioning measurement device based on received time information of a positioning signal transmitted by each positioning network element, PSS, and PSS information according to the preset positioning mode.

16. The device according to claim 15, wherein the positioning mode unit is configured to, when the positioning measurement device is able to connect with a network, determine together with a positioning center, E-SMLC, the preset positioning mode according to a protocol; or when the positioning measurement device is unable to connect with a network, read the preset positioning mode from a positioning information storage unit of the positioning measurement device, wherein the preset positioning mode is: a mode with a realization mode which is Downlink and a realization feature which is UE-based=yes; and the location calculation unit is configured to, according to the preset positioning mode, when the positioning measurement device is able to connect with the network, calculate the location information of the positioning measurement device based on the received time information of the positioning signals transmitted by each positioning network element, PSS, and the PSS information which is updated by the positioning information storage unit; and when the positioning measurement device is unable to connect with the network, calculate the location information of the positioning measurement device based on the received time information of the positioning signal transmitted by each positioning network element, PSS, and the PSS information which is stored by the positioning information storage unit.

17. The device according to claim 15, wherein the positioning mode unit is further configured to, when the positioning measurement device is able to connect with a network, determine together with a positioning center, E-SMLC, the preset positioning mode according to a protocol; and when the positioning measurement device is unable to connected with a network, read the preset positioning mode from a positioning storage unit, wherein the preset positioning mode is: a mode with a realization mode which is Downlink and a realization feature which is UE-based=no, UE=assisted and E-SMLC-based=yes; and the location calculation unit is configured to, when the realization mode is Downlink and the realization feature is UE-based=no, UE-assisted and E-SMLC-based=yes, determine the E-SMLC to calculate the location information of the positioning measurement device based on time information of the positioning signal transmitted by each positioning network element, PSS, and PSS information, wherein the device further comprises a location sending unit configured to set the E-SMLC to send the calculated location information of the positioning measurement device to the positioning measurement device which initiates the positioning request or other terminals.

18. The device according to claim 15, wherein the device further comprises a location sending unit configured to, if a positioning request is not a positioning request initiated by the positioning measurement device aiming at the positioning measurement device, send the location information to the E-SMLC; and if a positioning request is a positioning request initiated by the positioning measurement device aiming at the positioning measurement device, not send the location information to the E-SMLC.

19. A computer program, comprising program instructions, which, when executed by a positioning measurement device, enable the positioning measurement device to implement the method according to claim 1.

20. A non-transitory computer readable storage medium storing the computer program according to claim 19.

* * * * *